US009210583B2

(12) United States Patent
Henderson et al.

(10) Patent No.: US 9,210,583 B2
(45) Date of Patent: Dec. 8, 2015

(54) CENTRALIZED FEMTOCELL OPTIMIZATION

(75) Inventors: Thomas Henderson, Alpharetta, GA (US); Juan Bargallo, Lawrence, KS (US); David Ross Beppler, Duluth, GA (US); William Mansfield, Sugar Hill, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 168 days.

(21) Appl. No.: 13/312,843

(22) Filed: Dec. 6, 2011

(65) Prior Publication Data

US 2013/0143541 A1 Jun. 6, 2013

(51) Int. Cl.
*H04Q 7/10* (2006.01)
*H04W 16/24* (2009.01)
*H04W 24/02* (2009.01)
*H04W 84/04* (2009.01)

(52) U.S. Cl.
CPC .............. *H04W 16/24* (2013.01); *H04W 24/02* (2013.01); *H04W 84/045* (2013.01)

(58) Field of Classification Search
CPC ..... H04W 36/08; H04W 36/16; H04W 36/20; H04W 36/04; H04W 48/20; H04W 88/06; H04W 40/22
USPC ........ 455/418, 444, 446, 436, 435.2; 370/328
See application file for complete search history.

(56) References Cited

U.S. PATENT DOCUMENTS

| 8,554,223 | B2 * | 10/2013 | Lin et al. ................... 455/436 |
| 2010/0048217 | A1 * | 2/2010 | Deshpande et al. .......... 455/446 |
| 2010/0130212 | A1 * | 5/2010 | So et al. ..................... 455/444 |
| 2010/0184423 | A1 * | 7/2010 | Kent et al. .................. 455/422.1 |
| 2010/0203891 | A1 * | 8/2010 | Nagaraja et al. ............. 455/436 |
| 2010/0304743 | A1 * | 12/2010 | Jung et al. ................... 455/434 |
| 2011/0149878 | A1 * | 6/2011 | Ahmadi et al. .............. 370/329 |
| 2011/0244870 | A1 * | 10/2011 | Lee ............................. 455/444 |

(Continued)

FOREIGN PATENT DOCUMENTS

WO    WO 2011/075464 A1    6/2011

OTHER PUBLICATIONS

Eric Moore, "Docitive Networks—The Next Femto Evolution", Feb. 1, 2011, http://www.cable360.net/ct/sections/features/44941.html.

(Continued)

*Primary Examiner* — Wayne Cai
*Assistant Examiner* — Julio Perez
(74) *Attorney, Agent, or Firm* — Amin, Turocy & Watson, LLP

(57) ABSTRACT

Systems, methods, and apparatuses for centrally optimizing femtocells are presented herein. A scanning component can receive information from femtocells indicating respective operating conditions of the femtocells. Further, an optimization component can categorize the femtocells into groups based on the information, and direct a change of a parameter set of a group of the groups to a femtocell of the group. A method can include receiving, from femtocells, information associated with respective operating conditions of the femtocells; sorting the femtocells into groups based on the information; and directing a change of a parameter set that is associated with a group of the groups to a femtocell of the group. In an example, the method can further include directing a change of a parameter of a macrocell communicatively coupled to a femtocell of the femtocells.

20 Claims, 12 Drawing Sheets

(56) References Cited

U.S. PATENT DOCUMENTS

2011/0250891 A1* 10/2011 Zou et al. ................. 455/437
2012/0028630 A1* 2/2012 Yamamoto et al. ........ 455/422.1

OTHER PUBLICATIONS

Seungpyo Hong, "SON in Heterogeneous Networks", SK Telecom in SON Workshop 2010, Dec. 1, 2010, http://www.slideshare.net/zahidtg/son-in-heterogeneous-networks.

Lyndon Campbell-Black, "Well Done 'SON'—Femtocell Self Organising Networks" Mar. 10, 2011, http://ubiquisys.com/blog/well-done-son-femtocell-self-organising-networks/.

Han et al., "Optimization of Femtocell Network Configuration under Interference Constraints", 7th International Symposium on Modeling and Optimization in Mobile, Ad Hoc, and Wireless Networks, 2009. WiOPT 2009. Jun. 23-27, 2009.

"SON Manager Concept with Application to Heterogeneous Networks" Reverb Networks, Inc., 2011, http://www.reverbnetworks.com/content/son-manager-concept-application-heterogeneous-networks.

Simon Kong, "WiMAX Femto/SON Standard Status", Jul. 5, 2010, DMC R&D Center, Samsung, http://www.fmcforum.or.kr/board/include/download.php?no=4&db=class1&fileno=3.

"WiMAX Forum® Network Architecture Architecture, detailed Protocols and Procedures, Self-Organizing Networks", WMF-T33-120-R016v01, WiMax Forum, Jun. 25, 2010, http://www.wimaxforum.org/sites/wimaxforum.org/files/technical_document/2010/12/WMF-T33-120-R016v01_SON.pdf.

* cited by examiner

CENTRALIZED FEMTOCELL OPTIMIZATION

TECHNICAL FIELD

This disclosure relates generally to centralized femtocell optimization in wireless communication environments.

BACKGROUND

Wireless devices, e.g., cellular based devices, are ubiquitous. Moreover, demand for cellular services in areas where such services may be limited, e.g., residential or small business environments, has increased. Accordingly, a small cellular base station, e.g., femtocell, coupled to a wireless service provider's network via a broadband connection, can be located in such environments to improve wireless service capacity and/or coverage.

However, as increased amounts of femtocells are integrated into a broader cellular network to improve wireless service capacity and/or coverage, conventional techniques cannot adequately optimize tens, hundreds, thousands, etc. of femtocells included within a sector of a macrocell.

The above-described deficiencies of today's wireless communication networks and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with grouping femtocells into categories for centralized optimization of such femtocells.

For instance, a method can include receiving, from femtocells, information associated with respective operating conditions of the femtocells. In one example, the information can be received from the femtocells across multiple wireless network environments (e.g., a Global System for Mobile Communication (GSM) wireless environment, a Universal Mobile Telecommunication System (UMTS) wireless environment, a Long Term Evolution (LTE™) wireless environment, code division multiple access (CDMA), etc.), across multiple wireless network service providers, across multiple frequency bands and/or communication channels, etc. In another example, the information can indicate a result of a network scan performed by a femtocell, e.g., indicating macrocell neighbor(s) surrounding the femtocell, indicating power level(s) of signal(s) received from the macrocell neighbor(s), indicating interference associated with such sign(s), etc.

Further, the method can include sorting the femtocells into groups of femtocells based on the information, for example, utilizing a respective sorting criteria, e.g., utilizing a first level of categorization. In one example, the first level of categorization can be based on the respective operating conditions of the femtocells, e.g., power level(s) of signal(s) received from macrocell neighbor(s) of the femtocells, interference associated with such signals, etc. In another embodiment, the sorting the femtocells into the groups based on the respective sorting criteria further includes sorting the femtocells into the groups utilizing a second level of categorization, e.g., based on uplink measurement(s) associated with respective mobile stations, or user equipment (UE), communicatively coupled to femtocell(s) of a group of the groups of femtocells; based on a count of non-white listed mobile station(s) that attempted to register with the femtocell(s) of the group, etc. Additional levels of categorization may be available in accordance with example embodiments.

Furthermore, the method can include directing a change of a parameter set, e.g., including parameter(s) common to the femtocell(s) of the group, to the femtocell(s) of the group, e.g., based on operating condition(s) that are common to the femtocell(s) of the group. In one example, a change of a transmission power, a change of handover requirement(s), a selection of a wireless communication channel, etc. can be directed to the femtocell(s) of the group. As such, large number of femtocells can be effectively optimized in a centralized manner, e.g., to improve associated wireless customer experience(s).

In yet another embodiment, the method can include directing a change of a parameter of a macrocell communicatively coupled to the femtocell(s) of the group, e.g., based on the operating condition(s) that are common to the femtocell(s) of the group. For example, the change of the parameter of the macrocell can be associated with signal(s) transmitted by the macrocell, a direction of propagation of the signal(s) (e.g., controlled via a tilt, or downtilt, of an antenna of the macrocell), etc.

In one non-limiting implementation, a scanning component can receive information from femtocells indicating respective operating conditions of the femtocells. Further, an optimization component can categorize, or sort, the femtocells into groups based on the information, e.g., utilizing respective sorting criteria, and direct, to a femtocell of a group of the groups, a change of a parameter set of the group.

In an embodiment, the information can indicate a result of a network scan that is associated with a femtocell of the group, the femtocells, etc., e.g., indicating macrocell neighbor(s) discovered by, or communicatively coupled to, the femtocell. In another embodiment, the information can indicate a strength of a signal detected by the femtocell. In yet another embodiment, the respective sorting criteria can be based on an operating condition of the respective operating conditions, for example, based on the result of the network scan, e.g., the result indicating the strength of signal(s) detected, or received, by the femtocell of the femtocells, a received signal code power of a communication channel, e.g., a pilot channel, etc. that is associated with a macrocell that is communicatively coupled to, or neighboring, the femtocell, a level of interference of the signal(s) detected by the femtocell of the femtocells, a number of mobile stations, or UEs, communicatively coupled to the femtocell of the femtocells, a period of time, or busy hour, associated with a maximum traffic load of the femtocell of the femtocells, a location of the femtocell of the femtocells, a number of non-whitelisted UEs that attempted to register with the femtocell of the femtocells, etc.

In yet another embodiment, the parameter set of the group of the groups can include parameter(s) indicating, for the femtocell, a transmission power, a handover requirement (or information), etc.

In one embodiment, the optimization component can include a macrocell component configured to direct a change of an operating parameter of a macrocell, e.g., which can be communicatively coupled to the femtocell, for example, based on the operation condition of the respective operating conditions.

In another non-limiting implementation, a feedback component can direct another change, or second change, of the parameter set of the group of femtocells and/or the operating parameter of the macrocell based on other information that is received, via the scanning component, from the femtocells.

In yet another non-limiting implementation, a method can include receiving information from femtocells. Further, the method can include categorizing, or sorting, the femtocells into categories based on the information. Furthermore, the method can include directing, to a femtocell of a category of the categories, a change of a parameter that is associated with the category.

In one embodiment, the categorizing includes categorizing the femtocells into the categories based on a quality of a signal that is associated with the femtocell of the group, the femtocells, etc.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
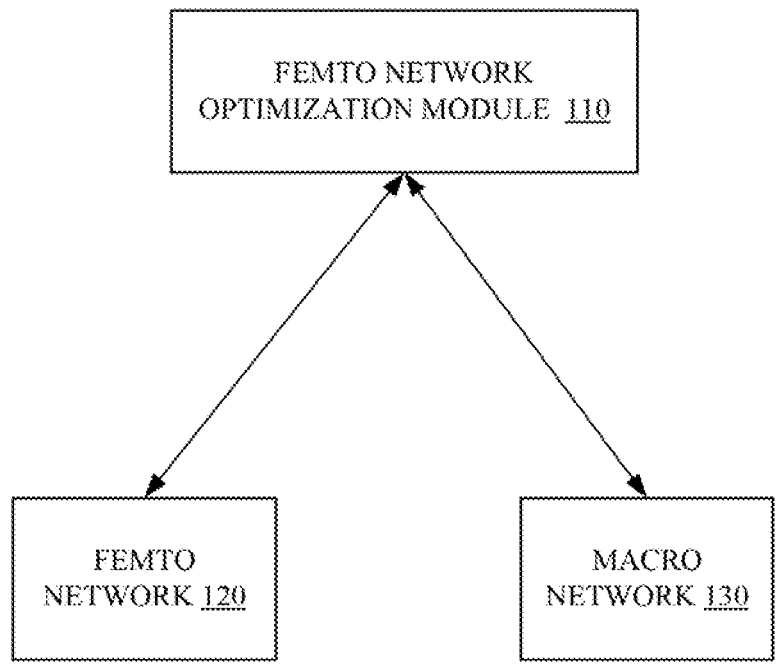
FIG. 1 illustrates a wireless network including a femto network optimization module (FeNOM) for centrally optimizing femtocells, in accordance with an embodiment.

As indicated in the background, conventional wireless technologies do not adequately optimize femtocells included within a sector of a macrocell. In consideration of these and other deficiencies of the conventional technologies, the subject matter disclosed herein relates to grouping femtocells into categories for centralized optimization of such femtocells.

In one embodiment, a method can comprise receiving, from femtocells, information associated with respective operating conditions of the femtocells; sorting the femtocells into groups based on the information; and directing a change of a parameter set that is associated with a group of the groups to a femtocell of the group.

In another non-limiting implementation, a system can comprise a scanning component configured to receive information from femtocells indicating respective operating conditions of the femtocells. Further, an optimization component can categorize the femtocells into groups based on the information, and direct a change of a parameter set of a group of the groups to a femtocell of the group.

In one embodiment, a computer-readable storage medium is provided comprising computer executable instructions that, in response to execution, cause a computing device to perform operations. The operations can include receiving information from femtocells; categorizing the femtocells into categories based on the information; and directing a change of a parameter of femtocells of a category of the categories to the femtocells of the category.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment can be included in at least one embodiment. Thus, the appearances of the phrase "in one embodiment," or "in an embodiment," in various places throughout this specification are not necessarily all referring to the same embodiment. Furthermore, the particular features, structures, or characteristics may be combined and/or distributed in any suitable manner in one or more embodiments.

As used in this application, the terms "component," "module," "system," "interface," and the like, are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures and computer-executable instructions stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" can be used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via optimization component 420 (described below) to automatically categorize femtocells into groups based on respective sorting criteria and direct, to a femtocell of a group of the groups, a change of a parameter set of the group.

As used herein, the term "infer" or "inference" refers to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein encompasses in one or more embodiments a computer program accessible from any computer-readable device, computer-readable carrier, or computer-readable media. For example, computer-readable media can include, but are not limited to, at least one of: a magnetic storage device, e.g., hard disk; a floppy disk; a magnetic strip; an optical disk (e.g., compact disk (CD), digital video disc (DVD), Blu-ray Disc™ (BD)); a smart card; a flash memory device (e.g., card, stick, key drive); and/or a virtual device that emulates a storage device and/or any of the above computer-readable media.

Moreover, terms like "user equipment" (UE), "mobile station", "mobile subscriber station", "access terminal", "terminal", "handset", "appliance", "machine", "wireless communication device", "cellular phone" and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence (see above), e.g., a capacity to make inference based on complex mathematical formalisms, that can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeably in the subject application, unless context warrants particular distinction(s) among the terms.

Aspects and/or features of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) LTE™; Third Generation Partnership Project 2 (3GPP2); Ultra Mobile Broadband (UMB); 3GPP UMTS; High Speed Packet Access (HSPA); High Speed Downlink Packet Access (HSDPA); High Speed Uplink Packet Access (HSUPA); LTE™ Advanced (LTE-A), GSM, Near Field Communication (NFC), CDMA, Wibree, Zigbee, IEEE 802.xx wireless technologies, Wi-Fi Direct™, etc.

Additionally, one or more embodiments described herein can include legacy telecommunication technologies, e.g., plain old telephone service (POTS). Further, selections of a radio technology, or radio access technology, can include second generation (2G), third generation (3G), and fourth generation (4G) evolution of the radio access technology; however, such selections are not intended as a limitation of the disclosed subject matter and related aspects thereof. Further, aspects and/or features of the disclosed subject matter can be exploited in different or disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

The subject disclosure relates to systems, methods, and apparatus that group femtocells into categories for centralized optimization of such femtocells in a wireless-based communication infrastructure. Femtocells are wireless access points that can interface with a wired or wireless broadband network, usually use a licensed radio spectrum operated and controlled by a wireless service provider, and can be deployed to improve indoor wireless coverage. Moreover, femtocells can reduce loading of over-the-air radio resources, e.g., radio frequency channels, etc. operated by the wireless service provider. User equipment (UE), e.g., a mobile wireless device, cell phone, wireless communications device, etc. can be operated by a subscriber of the wireless service provider within a femto coverage area, or femto network including one or more femtocells.

The UE can communicate with a core network, e.g., wired broadband network, via a femto access point (AP), or femtocell, utilizing a femto based wireless protocol. The femto AP can employ a backhaul network, e.g., broadband wired network backbone, to route packet communication, e.g., voice traffic, data traffic, data, etc., to the core network. The UE can register with the femto AP, and communication, such as voice and/or data traffic, can be routed to the subscriber via the femto AP utilizing the femto based wireless protocol. Further, the UE can communicate with the core network via a macro network that includes at least one base station that can serve mobile wireless devices in outdoor locations. Each base station can employ a backhaul network, e.g., broadband wired or wireless network backbone, to route packet communication, e.g., voice traffic, data traffic, data, etc. to the core network.

Now referring to FIG. 1, a wireless network 100 including a femto network optimization module (FeNOM) 110 for categorizing, grouping, etc. femtocells into specific categories, or "buckets", for optimizing femtocell(s) matching a sorting criteria associated with of a category of such categories is illustrated, in accordance with an embodiment. Wireless network 100 can include femto network 120 and macro network 130. Macro network 130 can include at least one base station (not shown) that serves mobile wireless devices (not shown) in outdoor and/or outdoor locations via a macrocell. The term "macrocell" refers to a coverage area, or geographical area, having a radius, e.g, of at least one kilometer, for example, or less, e.g., if situated to serve an area of high subscriber demand. The terms "microcell," "picocell," and "femtocell" refer to progressively smaller sized coverage areas.

While aspects and/or features of the subject disclosure are illustrated in relation to macrocells, macrocell access points, femtocells, and femtocell access points, such aspects and/or features are also applicable to, and can be implemented in: a microcell, or microcell access point; a picocell, or picocell access point; a Wi-Fi™ access point; a WiMAX™ access point; a Bluetooth™ access point; other wireless-based access points; or the like. Further, macro network 130 can include a core network (not shown) comprising one or more cellular technologies, e.g., 3GPP UMTS, GSM, LTE™, etc. Each base station, or access point, of macro network 130 can communicate with the core network via a wired backbone link (not shown), e.g., optical fiber, twisted-pair, coaxial cable, licensed/unlicensed microwave link, free-space optical connection, etc.

Femto network 120 can include femtocells (not shown), which are wireless access points that can interface with FeNOM 110 and macro network 130. It should be appreciated that although femto network 120 is illustrated in FIG. 1 as an entity distinct from macro network 130, one or more components, features, e.g., hardware, software, etc. of femto network 120 can be located/included within and/or across one or more locations, components, e.g., hardware, software, etc., of macro network 130. For example, one or more femtocells of femto network 120 can be located within a macrocell served by a base station of macro network 130.

Further, it should be appreciated that although FeNOM 110 is illustrated in FIG. 1 as an entity distinct from femto network 120 and macro network 130, one or more components, e.g., hardware, software, etc. of FeNOM 110 can be located/included within and/or across one or more locations, components, e.g., hardware, software, etc. of femto network 120 and/or macro network 130.

A mobile wireless device served by macro network 130, and operated by a subscriber within a femto coverage area of femto network 120, can communicate with the core network of macro network 130 via one or more femtocells, or femto access points (APs) (not shown), and/or one or more macrocell access points. The mobile wireless device can register with a femto AP and communication, e.g., voice and/or data traffic, can be routed to the subscriber through the femto AP utilizing a femto based wireless protocol, e.g., based on a licensed or unlicensed radio spectrum. The femto AP can employ a backhaul network (not shown), e.g., broadband wired or wireless network backbone, to route packet communication, e.g., voice traffic, data traffic, data, etc. to the core network of macro network 130.

Example embodiments can optimize tens, hundreds, thousands, etc. of femtocells included within a sector of a macrocell. For example, FeNOM 110 can centrally optimize femtocells, e.g., within femto network 120 and/or macro network 130, by grouping such femtocells into groups, or categories, and directing a change of a parameter to femtocell(s) of a group of groups.

Figure 2:
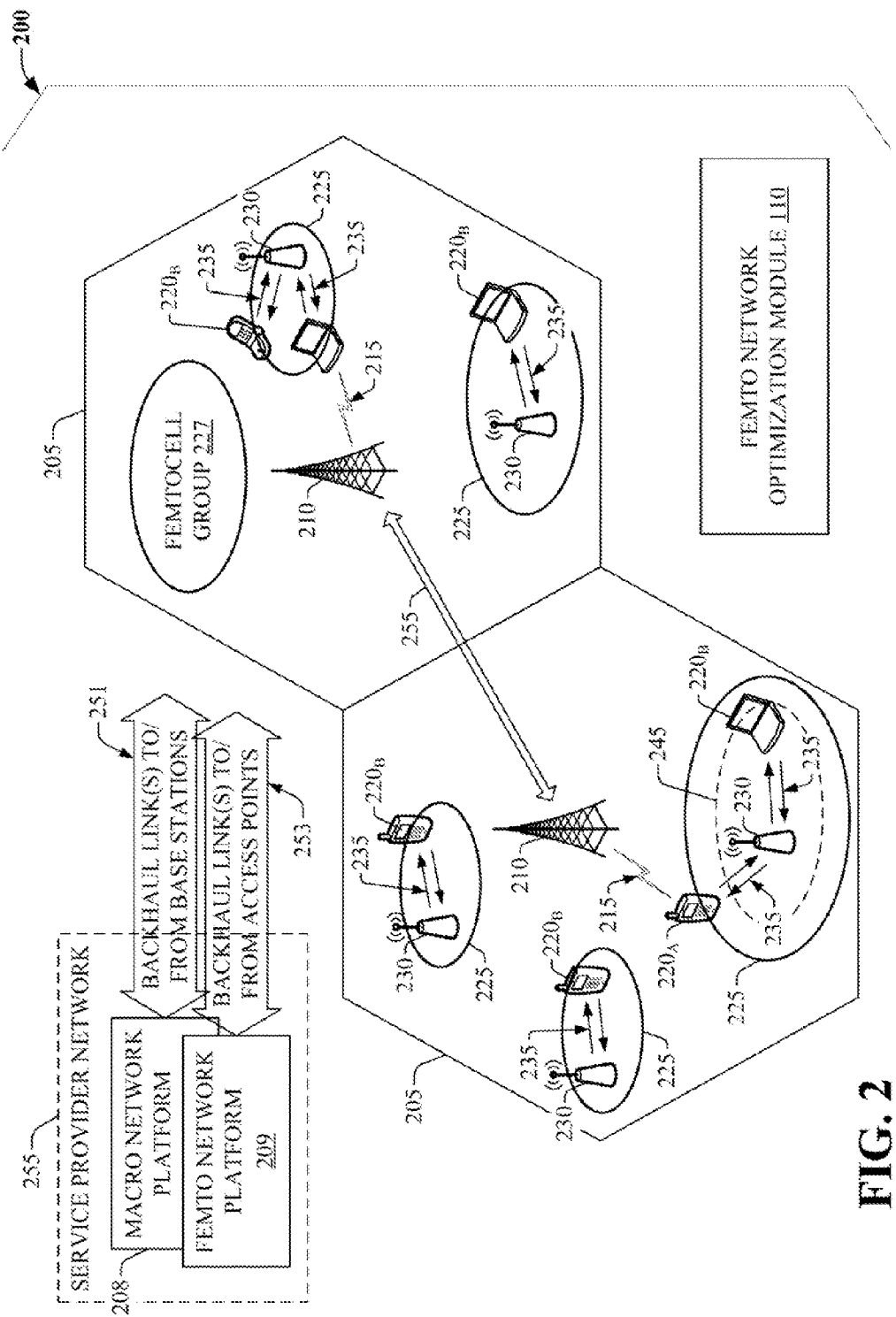
FIG. 2 illustrates a wireless environment including a FeNOM for centrally optimizing femtocells, in accordance with an embodiment.

FIG. 2 illustrates a wireless environment 200 that includes FeNOM 110, in accordance with an embodiment. Each macrocell 205 represents a "macro" cell coverage area, or sector, served by a base station 210. It should be appreciated that although macrocells 205 are illustrated as parallelograms, macrocells 205 can adopt other geometries, or polygons, e.g., dictated by spatial data, deployment, or topography of the macrocell coverage area (or covered geographic area), e.g., metropolitan statistical area (MSA), rural statistical area (RSA), etc. Macrocell coverage can serve mobile wireless devices, e.g., mobile wireless device $220_A$, mobile wireless device $220_B$, etc. in outdoor locations. An over-the-air wireless link 215 provides the macro coverage, and includes a downlink (DL) and an uplink (UL) (both not shown) that can utilize a predetermined band of radio frequency (RF) spectrum associated with, e.g., GSM, 3GPP UMTS, LTE™, etc. Accordingly, mobile wireless device $220_A$ can be a GSM, 3GPP UMTS, LTE™, etc. mobile phone, while $220_B$ can be a remote computing device with GSM, 3GPP UMTS, LTE™, etc. capabilities.

Base station 210—including associated electronics, circuitry and/or components—and wireless link 215 can form a radio network, e.g., base station subsystem (BSS) associated with a GSM wireless network, or radio access network (RAN) associated with a UMTS wireless network. In addition, base station 210 can communicate with macro network platform 208 via backhaul link(s) 251. Macro network platform 208 can represent a core network comprising one or more cellular wireless technologies, e.g., 3GPP UMTS, GSM, LTE™, etc. In one aspect, macro network platform 208 can control a set of base stations 210 that serve either respective cells or a number of sectors within such cells. Macro network platform 208 can also communicate with other base stations (not shown) that serve other cells (not shown). Backhaul link(s) 251 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 251 can link different or disparate base stations 210 based on macro network platform 208.

Packet communication, e.g., voice traffic, data traffic, can be routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 210 can be connected to the backhaul network, e.g., service provider network 255, via a broadband modem (not shown) and backhaul link(s) 251. Through backhaul link(s) 251, base station 210 can handle substantially any quality of service (QoS) for heterogeneous packetized traffic, e.g., various multiple packet flows.

Base station 210 can integrate into an existing network, e.g., GSM network, 3GPP network, LTE™ network, etc. via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

A group of femtocells 225, femto access points (APs) 230, etc. can be deployed within each macro cell 205. While at least three femtocells 225 are deployed per macro cell 205 as shown in FIG. 2, aspects of the subject disclosure can be directed to femtocell deployments with substantive femto AP 230 density, e.g., tens of thousands of, femto APs 230 per base station 210. As such, femtocell group 227 as illustrated in FIG. 2 includes more than $10^4$ femto APs 230 (not shown). Femtocell 225 can cover an area (or coverage area) that includes confined area 245, which can be determined, at least in part, by transmission power allocated to femto AP 230, path loss, shadowing, etc. While confined area 245 and the coverage area can coincide, it should be appreciated that in certain deployment scenarios, the coverage area can include an outdoor portion, e.g., parking lot, patio deck, recreation area; while confined area 245 can be enclosed by a building, e.g., home, retail store, business. The coverage area can span a coverage radius ranging from 20 to 100 meters. Confined area 245 can be associated with an indoor space and/or building, such as a residential space, e.g., house, condominium, apartment complex, etc.; business space, e.g., retail store, mall, etc.; or public space, e.g., library, hospital, etc. Such spaces can span, for example, 5000 sq. ft or larger.

Femto AP 230 can serve a few (e.g., 1-64) wireless devices, e.g., UE $220_A$ and subscriber station $220_B$, within coverage areas associated with respective femtocells 225—each wireless device coupled to femto AP 230 via a wireless link 235 that comprises a downlink and an uplink (depicted as arrows in FIG. 2). A femto network platform 209 can control such service(s), in addition to registering at least one femto AP 230, provisioning parameters in the at least one femto AP 230, managing macro-to-femto handover, and/or managing femto-to-macro handover. Control or management can be facilitated by access point backhaul link(s) 253 that connect deployed femto APs 230 with femto network platform 209. Access point backhaul link(s) 253 are substantially similar to backhaul link(s) 251.

Femto network platform 209 can also include components, e.g., nodes, gateways, interfaces, that facilitate packet-switched (PS), e.g., internet protocol (IP), traffic and signal generation for networked telecommunication. It should be appreciated that femto network platform 209 can integrate seamlessly with substantially any PS-based and/or circuit switched (CS)-based network (such as macro network platform 208). Thus, operation with a wireless device such as $220_A$ can be substantially seamless when handover from femto-to-macro, or vice versa, occurs.

As an example, femto AP 230 can integrate into an existing network, e.g., GSM, 3GPP, LTE™, etc. via various interfaces, for example: via an A-bis interface (not shown) between a base transceiver station (BTS) and a base station controller (BSC); via an Iub interface (not shown) between a radio network controller (RNC) and base station 210; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

It should be appreciated that although FeNOM 110 is illustrated by FIG. 2 as an entity distinct from, e.g., macro network platform 208, femto network platform 209, base stations 210, femtocells 225, femto APs 230, service provider network 225, etc. aspects and/or features of FeNOM 110 can be located/included within and/or across one or more components, e.g., hardware, software, etc., of wireless network 200. For example, in one embodiment, aspects and/or features of FeNOM 110 can be located within any component(s) of a GSM, UMTS, or LTE™ core network, e.g. service provider network 255. In another embodiment, FeNOM 110 can be located and/or integrated in/with hardware and/or software of macro network platform 208, femto network platform 209, base station 210, femtocells 225, femto APs 230, service provider network 225, etc. Moreover, it should be appreciated that features of embodiments described herein can be implemented in microcells, picocells, or the like, wherein base station 210 can be embodied in an access point.

As described above, as increased amounts of femtocells are integrated into a broader cellular network to improve wireless service capacity and/or coverage, example embodiments can adequately optimize femtocells included within a sector of a macrocell. For example, FeNOM 110 can group femtocells, e.g., across multiple wireless network service providers, across multiple frequency bands and/or communication channels, etc. into categories based on respective sorting criteria. Further, FeNOM 110 can optimize femtocell(s) of a category of the categories by directing a change of a parameter set of the femtocell(s) to the femtocell(s).

Figure 3:
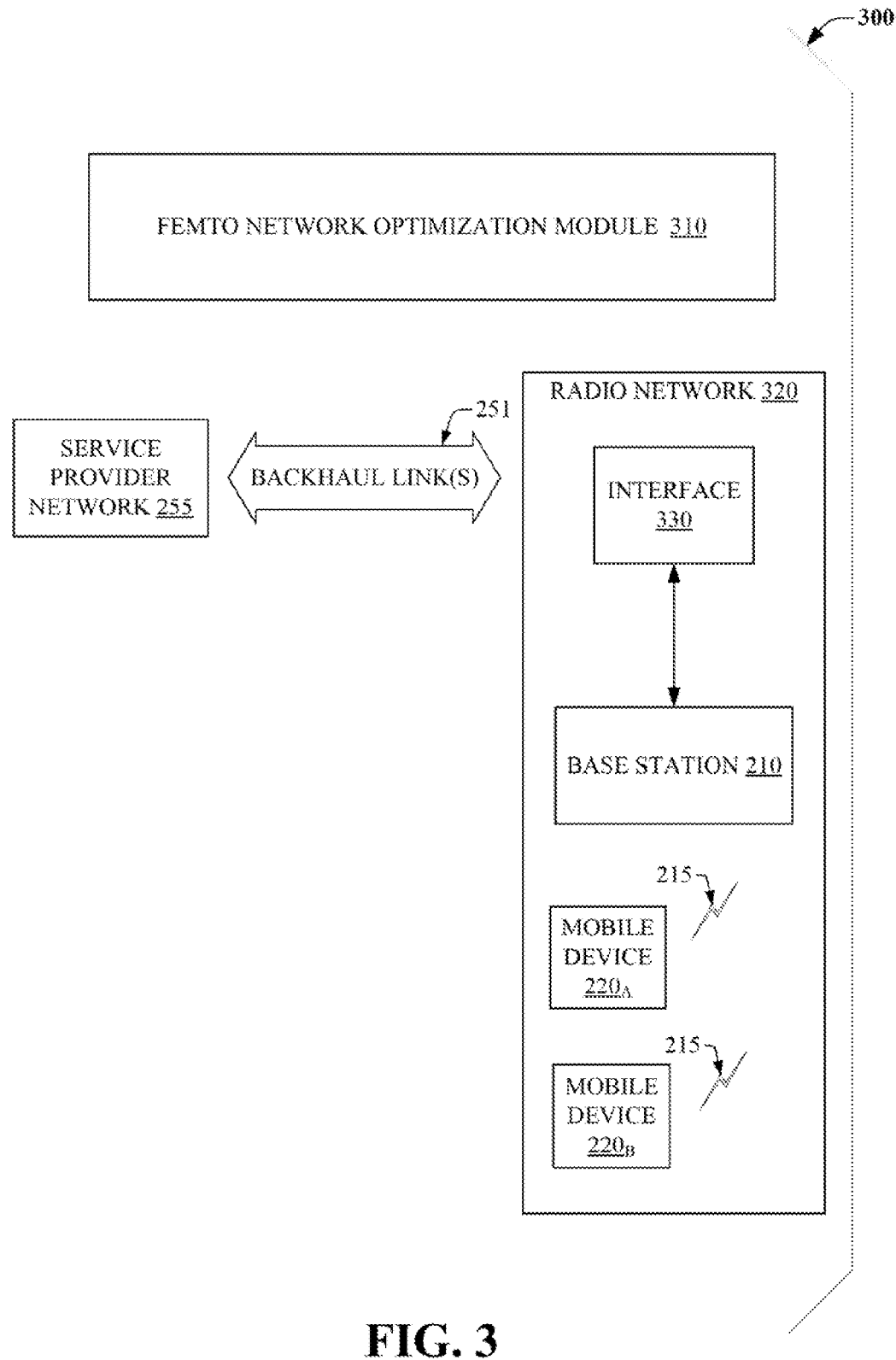
FIG. 3 illustrates another wireless environment including a FeNOM for centrally optimizing femtocells, in accordance with an embodiment.

FIG. 3 illustrates another wireless environment (300) for optimizing femtocells in a centralized manner, in accordance with an embodiment. Wireless environment 300 can comprise one or more base stations 210, for example: coupled to a BSC forming a base station system (BSS), coupled to an RNC forming a UMTS Terrestrial Radio Access Network (UTRAN), etc. Radio network 320 can couple to a core network, e.g., service provider network 255, via one or more backhaul links 251 (see above) to facilitate wireless communication and data transfer to one or more wireless devices, e.g., mobile wireless device 220$_A$/mobile wireless device 220$_B$, in accordance with the disclosed subject matter. Radio network 320 can comprise any wireless technology, e.g., GSM, UMTS, LTE™, CDMA, etc.

Wireless environment 300 includes FeNOM 110 that can optimize femtocells, e.g., femto AP 230, etc. by sorting the femtocells into categories based on respective sorting criteria, e.g., associated with operating conditions of the femtocells. Further, FeNOM 110 can change a parameter common to femtocells (e.g., a large number of femtocells) included in a category in a centralized manner. Furthermore, FeNOM 110 can be used via any wireless technology implementing wireless access points(s), e.g., GSM, 3GPP UMTS, LTE™, etc. Moreover, it should be appreciated that although FeNOM 110 is illustrated by FIG. 3 as an entity distinct from, e.g., radio network 320, service provider network 255, etc. aspects and/or features of FeNOM 110 can be located/included within and/or across one or more components, e.g., hardware, software, etc., of wireless environment 300, e.g., within or among hardware and/or software of components of radio network 320 and/or service provider network 255.

Further, one or more aspects of wireless environment 300, and the wireless environments, networks, systems, apparatus, and processes explained herein, can constitute machine-executable instructions embodied within machine(s), e.g., embodied in one or more computer readable mediums (or media) associated with one or more machines. Such instructions, when executed by the one or more machines, e.g., computer(s), computing device(s), virtual machines(s), etc. can cause the machine(s) to perform operations described.

Additionally, the systems and processes can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Figure 4:
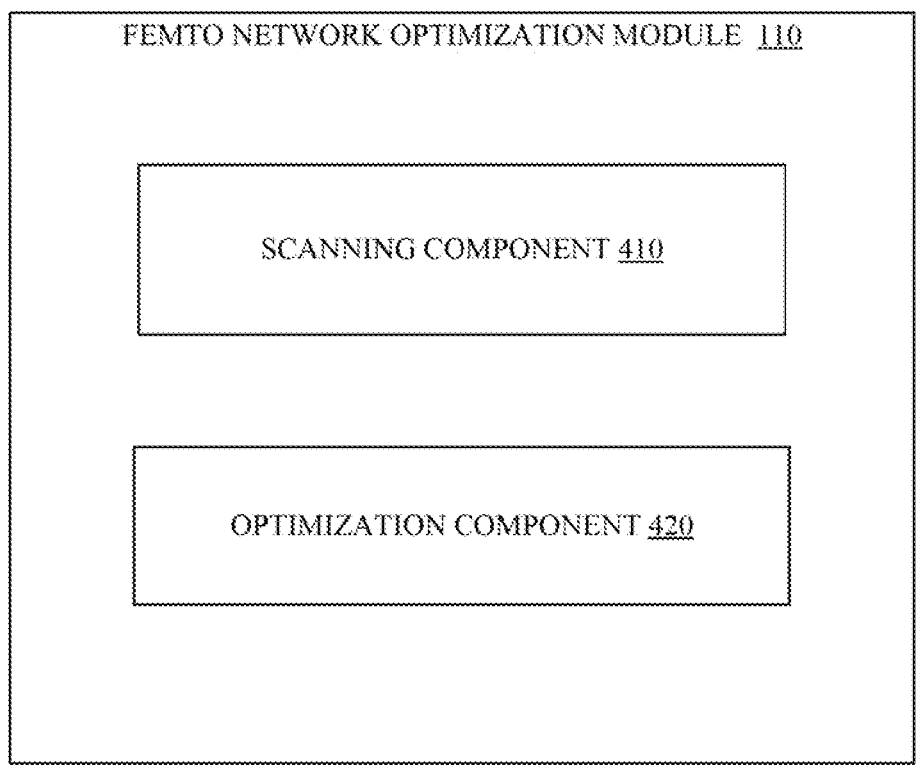
FIG. 4 illustrates a FeNOM for centrally optimizing femtocells, in accordance with an embodiment.

Now referring to FIG. 4, a FeNOM 110 including scanning component 410 and optimization component 420 is illustrated, in accordance with an embodiment. Scanning component 410 can be configured to receive information from femtocells indicating respective operating conditions of the femtocells. In one aspect, the information can be received from the femtocells across multiple-wireless access providers, multiple-wireless technologies, multiple-wireless communication channels, etc. In another aspect, the information can indicate operating condition(s) associated with respective femtocells, e.g., indicating wireless condition(s) associated with macrocell(s) communicatively coupled to the femtocells.

In yet another aspect, the information can indicate a result of a network scan that is associated with at least one of the femtocells, e.g., indicating macrocells discovered by, or communicatively coupled to, such femtocell(s). For example, the result can indicate power levels of respective signals associated with the macrocells, e.g., indicating received signal code power (RSCP), received signal strength indication (RSSI), received signal strength (RxLev), etc. that is associated, for example, with a wireless communication channel, e.g., a pilot channel, etc. In another example, the result can indicate a level of interference of a signal that is detected, received, etc. by the femtocell(s), e.g., indicating an energy per chip to total power received (Ec/No).

Further, optimization component 420 can be configured to categorize the femtocells into groups based on the information, for example, utilizing a sorting criteria, e.g., based on a first level of categorization. In an aspect, a sorting criteria of the first level of categorization can be based on an operating condition of the respective operating conditions common among femtocells of a group of the groups. For example, the operating condition can indicate a received signal code power that is associated with a communication channel utilized by femtocell(s) of the group, a received signal strength indicator that is associated with a signal that is received by the femtocell(s) of the group, a level of interference of a signal that is detected by the femtocell(s) of the group, etc.

In another embodiment, optimization component 420 can be configured to further categorize the femtocells into the groups based on a second level of categorization. In an aspect, a sorting criteria of the second level of categorization can be based on information indicating UL measurements from UEs attached to the femtocells—the UEs reporting wireless condition(s), etc. that are associated with macrocell(s) extended past a detection range of respective femtocells communicatively coupled to the UEs. In other embodiments, the second level of categorization can be based on information indication a number of UEs communicatively coupled, or attached, to femtocell(s) of the group, a period of time associated with busy/non-busy hour(s) of the femtocell(s), time(s) associated with a higher/lower use of communication bandwidth associated with the femtocell(s) compared to other time(s), allocation of the femtocell(s), a number of non-whitelisted UEs, or UEs not authorized to access a femtocell, which attempted to register with the femtocell(s), etc.

Furthermore, optimization component 420 can be configured to direct a change of a parameter set of a group of the groups to a femto cell of the group. In an aspect, optimization component 420 can direct a change of a transmission power of femtocell(s) of the group, direct a change of a handover requirement of femtocell(s) of the group, etc. For example, automatic parameter optimization (APO) of the femtocell(s) of the group can be enhanced by centrally applying, via FeNOM 110, changes to parameters of "like femtocells" of a group matching a similar sorting criteria. As such, FeNOM 110 can effectively optimize a large number of "like" femtocells across disparate wireless communication/network environments.

For example, scanning component 410 can receive information from femtocells, e.g., a first portion of the femtocells located on the west coast of the United States and a second portion of the femtocells located on the east coast of the United States, indicating the femtocells are associated with a large number of attempted attachments by non-whitelisted UEs. Further, optimization component 420 can categorize the femtocells into a group, e.g., indicating femtocells associated with the large number of attempted attachments. Furthermore, optimization component 420 can direct a change of transmission power to femtocells of the group, e.g., to reduce attachment attempts made by respective non-whitelisted UEs. As such, FeNOM 110 can centrally optimize a large number of femtocells across disparate wireless network environments for improving wireless customer experience(s).

In one embodiment, optimization component 420 can direct a change of a hand-out/hand-in/handover criterion based on a threshold value, a hysteresis value, a time-based criterion, etc. For example, optimization component 420 can direct a handover from a femtocell to a macrocell in response to a difference between a first signal quality associated with the macrocell and a second signal quality associated with the femtocell being greater than or equal to a threshold value. In another example, optimization component 420 can direct the handover by utilizing hysteresis values to account for noise associated with signal quality measurements. As such, optimization component 420 can direct the handover in response to signal quality levels being reduced, or detected, within the hysteresis values, or range. In yet another example, optimization component 420 can utilize a timer to direct the handover, for example, directing the handover in response to a signal quality level meeting, being detected at, etc. a predetermined criteria for a predetermined period of time.

In one aspect, optimization component 420 can direct a change of respective femto neighbor lists associated with the femtocells of the group, reprioritize the respective femto neighbor lists, direct a change of handoff parameters, e.g., associated with performance of a handoff between a femtocell and a macrocell communicatively coupled to the femtocell, etc. For example, scanning component 410 can receive first information from femtocells indicating a first handover failure rate, e.g., over twenty-four hours. Further, optimization component 420 can group femtocells having the first handover failure rate into a first category based on a first level of categorization. Furthermore, optimization component 420 can further group femtocells of the first category into a second category based on a signal strength corresponding to a first detected neighbor, e.g., macrocell corresponding to a highest detected signal strength. In an aspect, optimization component 420 can direct a change of an operating parameter of femtocells of the second category, e.g., re-prioritizing respective neighbor lists of the femtocells of the second category to initially prefer, favor, etc. selection of the macrocell corresponding to the highest detected signal strength in response to a handover.

Figure 5:
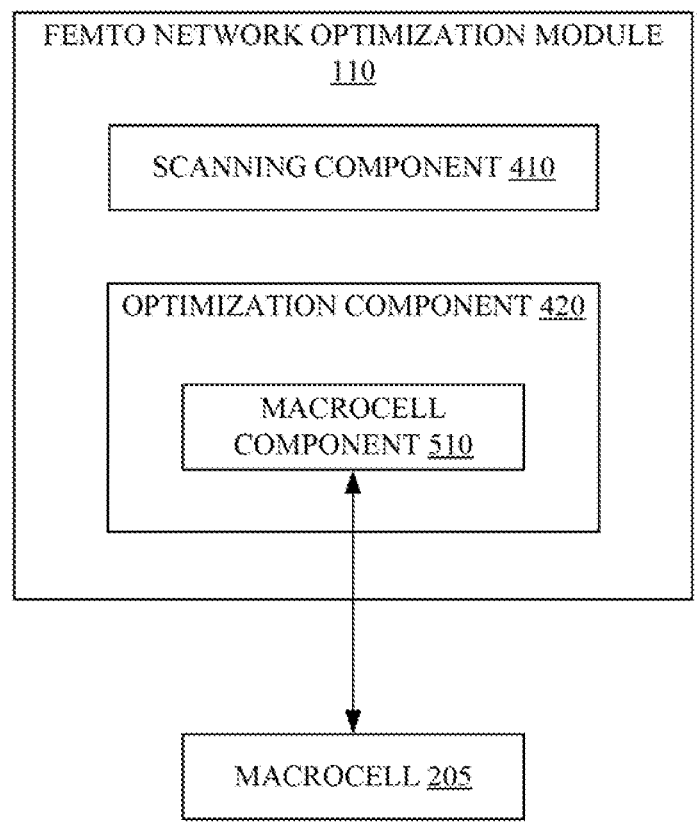
FIG. 5 illustrates a FeNOM including a macrocell component for centrally optimizing femtocells, in accordance with an embodiment.

In an embodiment illustrated by FIG. 5, optimization component 420 can include a macrocell component 510 communicatively coupled to macrocell(s), e.g., macrocell 205. Macrocell component 510 can be configured to direct a change of an operating parameter of macrocell 205, which is communicatively coupled to one or more femtocells, based on an operating condition of the femtocells. For example, the operating condition of the femtocells can be associated with a particular level of interference between respective signals transmitted by the femtocells and signal(s) transmitted by macrocell 205. In an aspect, optimization component 420 can determine in-building penetration and/or pilot pollution associated with the signal(s) transmitted by macrocell 205, e.g., based on a particular decibel level of difference between signal(s) transmitted by the femtocells and the signal(s) transmitted by macrocell 205/detected by the femtocells.

Further, based on a level of interference evaluated by optimization component 420, macrocell component 510 can direct, to macrocell 205, a change of a direction of propagation of the signal(s) transmitted by macrocell 205, e.g., controlled via a tilt of an antenna of macrocell 510, a change of (e.g., reducing) transmission power associated with the signal(s) transmitted by macrocell 205, etc. As such, macrocell component 510 can effectively perform coverage capacity optimization (CCO) in a centralized manner.

Figure 6:
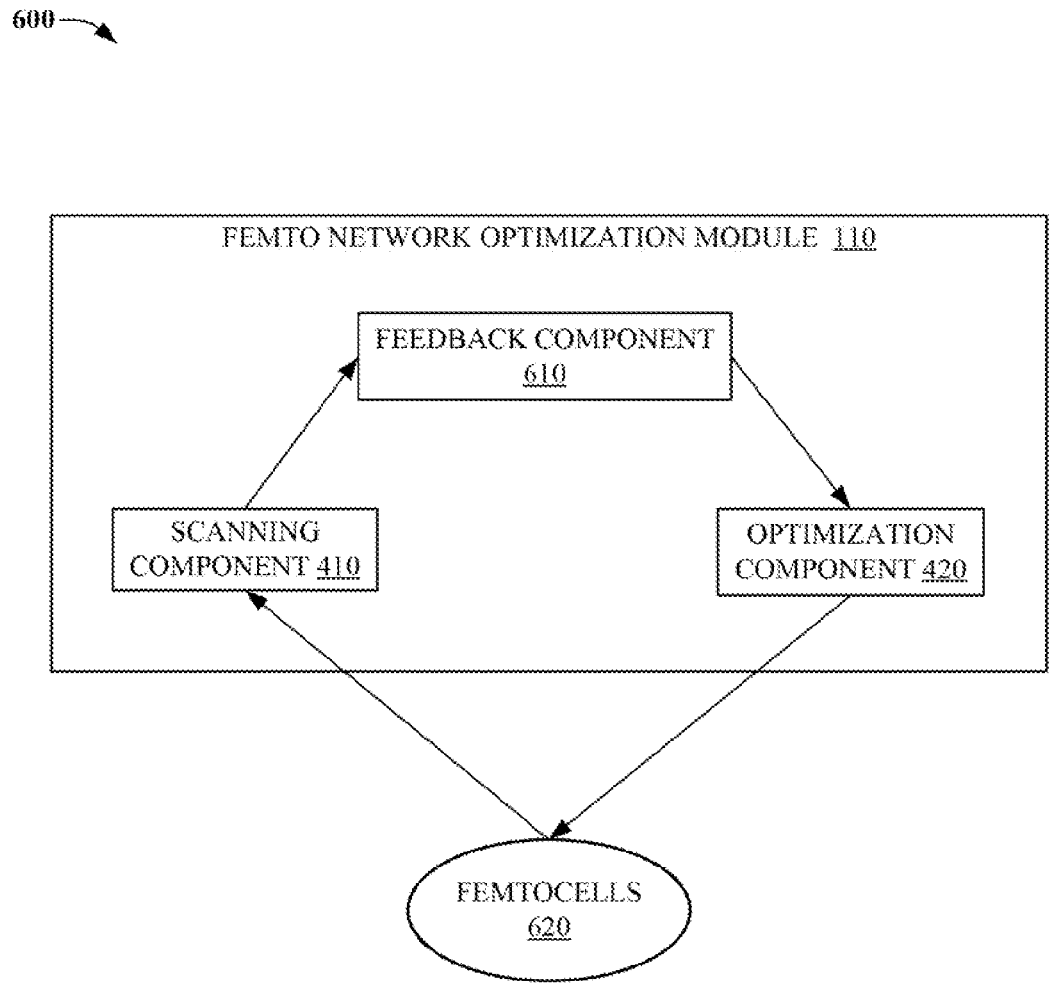
FIG. 6 illustrates a FeNOM including a feedback component for centrally optimizing femtocells, in accordance with an embodiment.

In another embodiment illustrated by FIG. 6, FeNOM 110 can include feedback component 610 communicatively coupled to one or more femtocells of femtocells 620, e.g., femtocell 230, etc. Feedback component 610 can be configured to direct an other change of the parameter set of the group of the groups to a femtocell of femtocells 620 based on other information that is received from the femtocell, e.g., via a feedback loop. In one embodiment, and referring to the example above, in response to scanning component 410 receiving second information from the femtocells indicating a second handover failure rate, feedback component 620 can direct, e.g., via optimization component 420, re-prioritization of the respective neighbor lists of the femtocells of the second category to such femtocells.

Figure 7:
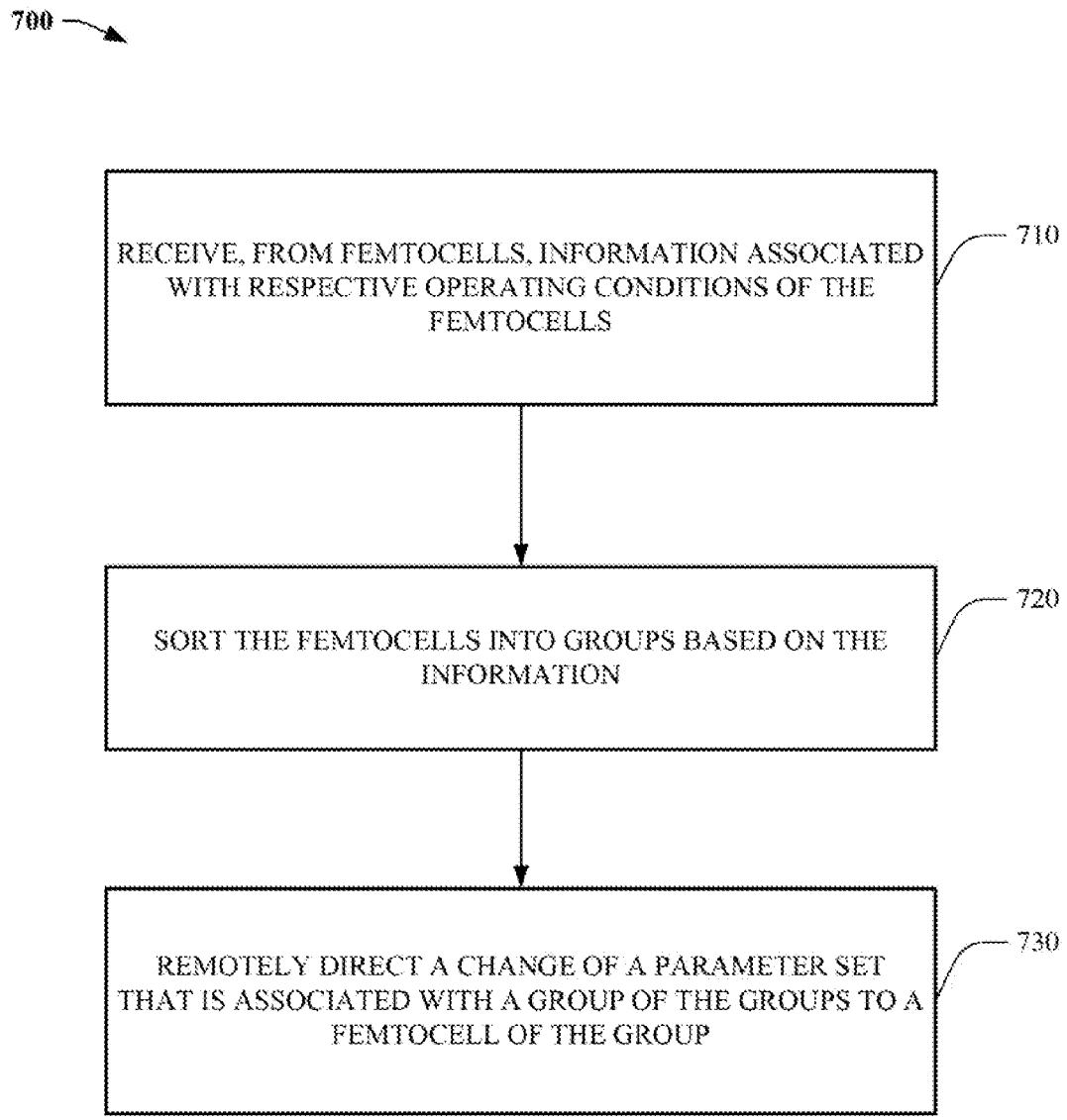
FIGS. 7-9 illustrate illustrative processes according to various embodiments.
Figure 8:
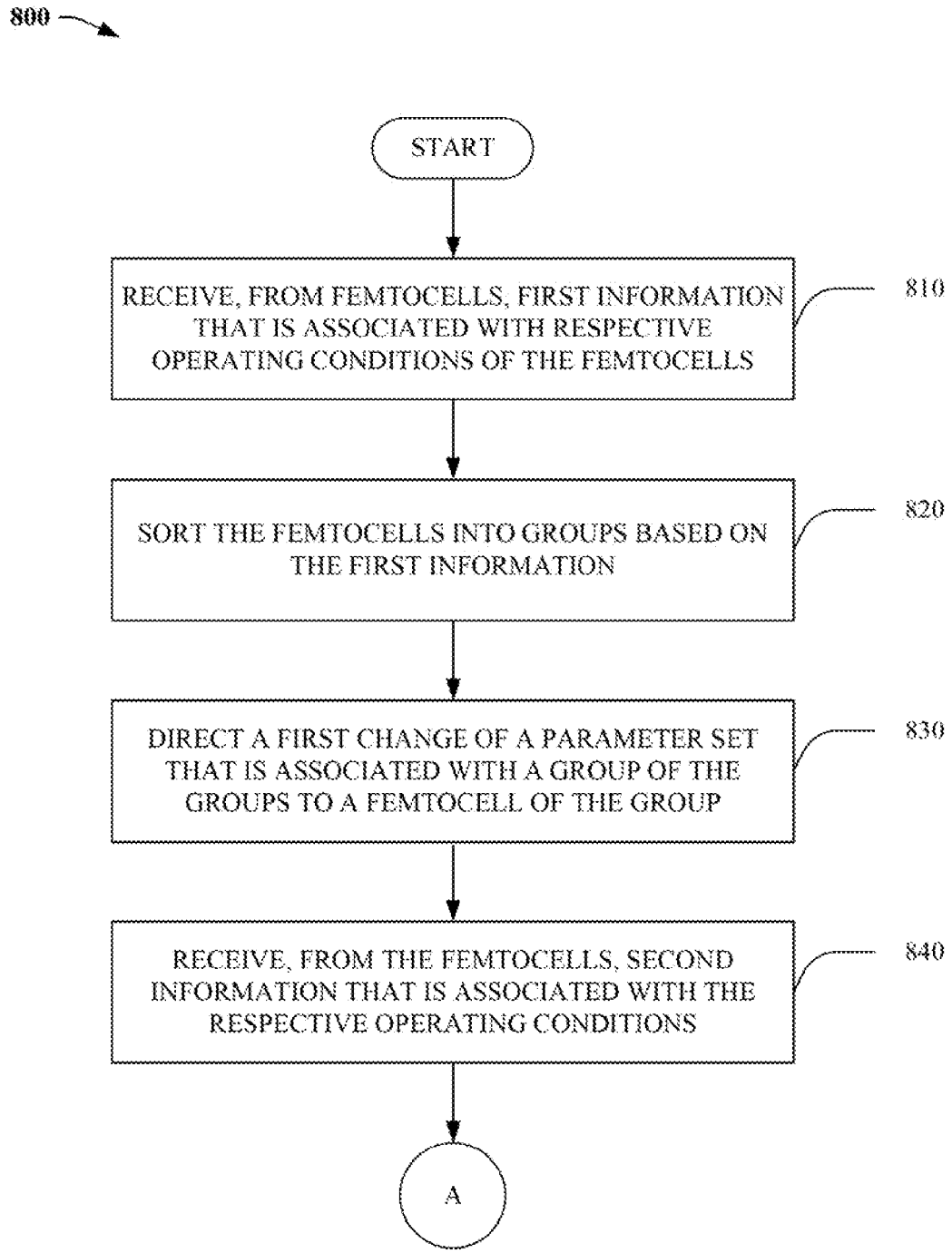
Figure 9:
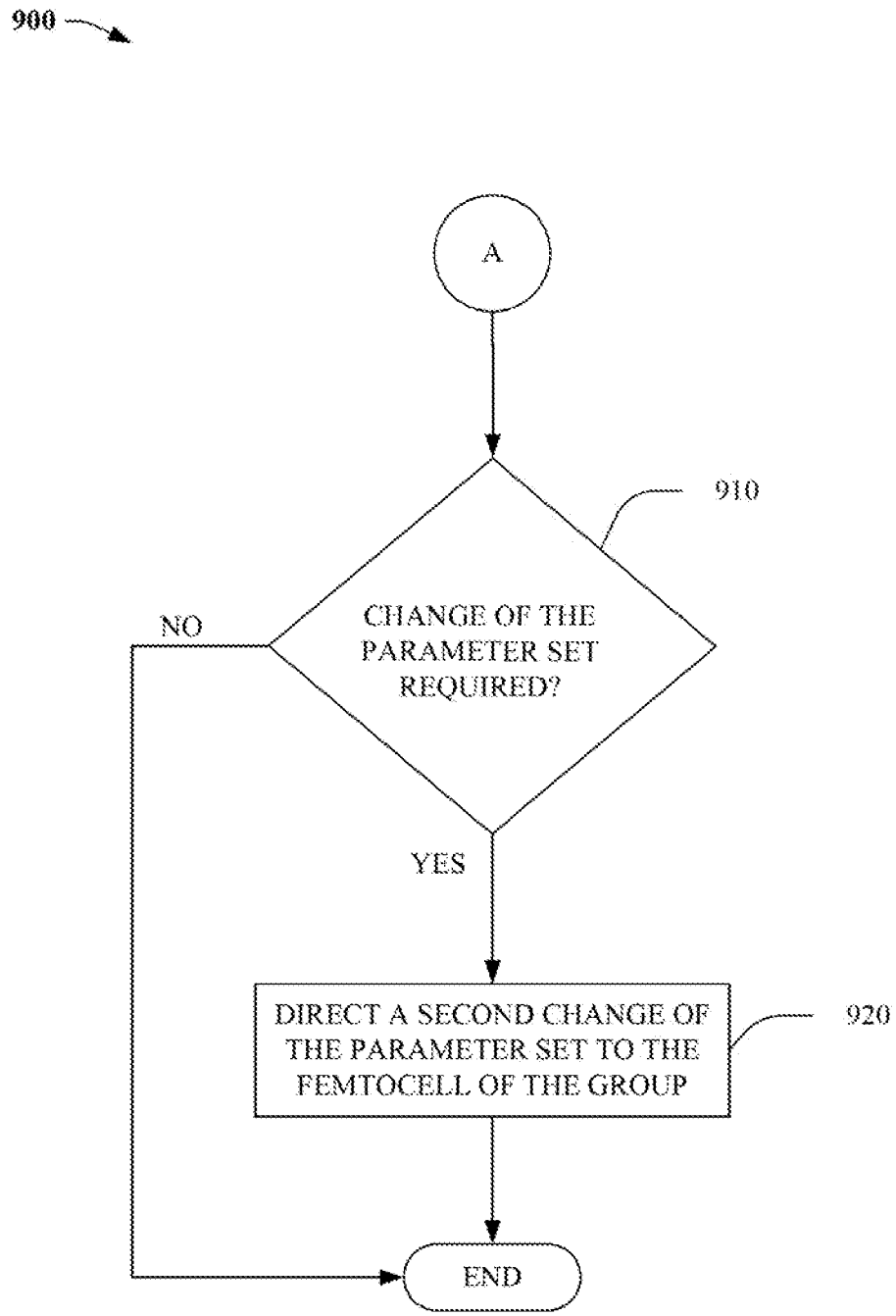

FIGS. 7-9 illustrate methodologies in accordance with the disclosed subject matter. For simplicity of explanation, the methodologies are depicted and described as a series of acts. It is to be understood and appreciated that embodiments described herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, can encompass a computer program accessible from any computer-readable device, carrier, or media.

Referring now to FIG. 7, a process 700 associated with FeNOM 110 is illustrated, in accordance with an embodiment. At 710, process 700 can receive, from femtocells, information associated with respective operating conditions of the femtocells. In an aspect, the information can indicate a result of a network scan that is associated with at least one of the femtocells, e.g., indicating macrocells discovered by, or communicatively coupled to, such femtocell(s), indicating power levels of respective signals associated with the macrocells (e.g., RSCP, RSSI, RxLev, etc.), indicating a level of interference of a signal that is detected, received, etc. by the femtocell(s), e.g., indicating an energy per chip to total power received (Ec/No), etc.

At 720, the femtocells can be sorted, categorized, etc. into groups based on the information. At 730, a change of a parameter set that is associated with a group of the groups can be remotely directed, e.g., via a wireless and/or a wired communication protocol, to a femtocell of the group.

FIGS. 8-9 illustrate processes (800 and 900) associated with FeNOM 110, in accordance with various embodiments. At 810, first information that is associated with respective operating conditions of femtocells can be received from the femtocells. At 820, the femtocells can be sorted into groups based on the first information. At 830, a first change of a parameter set that is associated with a group of the groups can be directed to a femtocell of the group. At 840, second information that is associated with the respective operating conditions can be received from the femtocells.

Flow continues from 840 to 910, at which process 900 can determine whether a change of the parameter set can be made, e.g., for adjusting performance that is associated with the femtocell of the femtocell of the group, e.g., based on an improvement/degradation in performance that is indicated by the second information, etc. If it is determined the change can be made, flow continues to 910, at which a second change of the parameter set can be directed to the femtocell of the group; otherwise process 900 ends.

Figure 10:
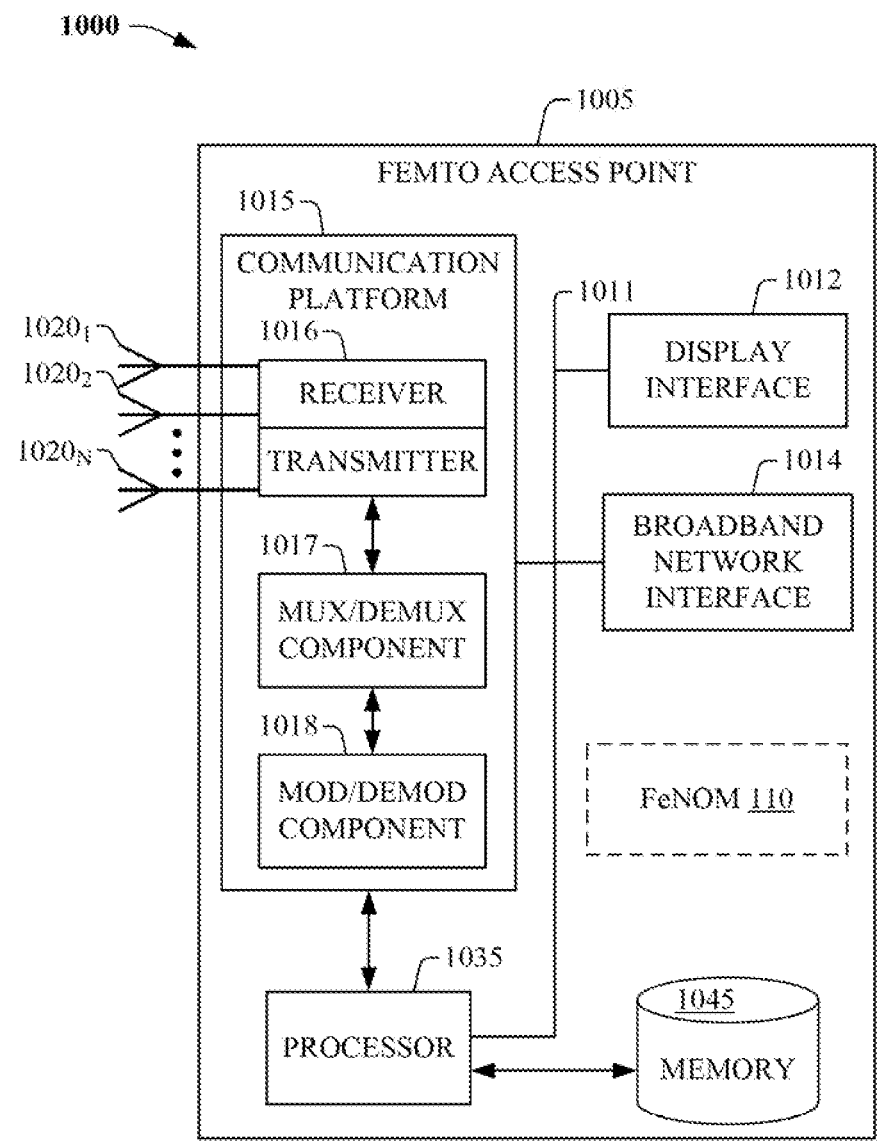
FIG. 10 illustrates a block diagram of a femto access point, in accordance with an embodiment.
Figure 11:
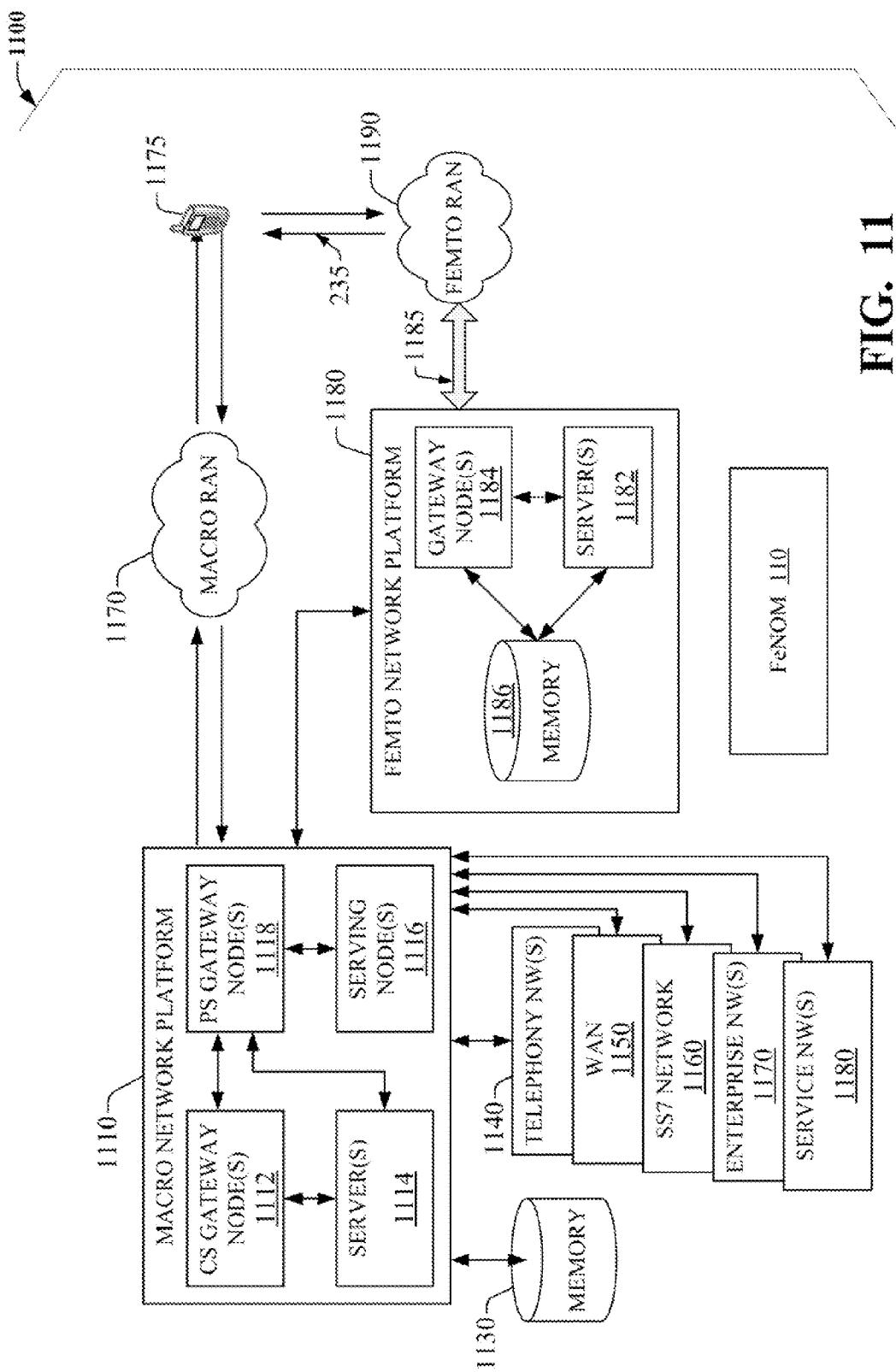
FIG. 11 illustrates a block diagram of a wireless network environment, in accordance with an embodiment.

To provide further context for various aspects of the disclosed subject matter, FIGS. 10 and 11 illustrate, respectively, a block diagram of an embodiment 1000 of a femtocell access point 1005 that can enable or exploit features and/or aspects of the disclosed subject matter; and a wireless network environment 1100 that includes femto and macro network platforms, which can enable aspects or features of a mobile network platform as described herein, and utilize femto APs that exploit various aspects of the subject specification. In embodiment 1000, femto AP 1005 can receive and transmit signal(s) from and to wireless devices, e.g., UEs, access terminals, wireless ports and routers, or the like, through a set of antennas $1020_1$-$1020_N$ (N is a positive integer). Antennas $1020_1$-$1020_N$ are a part of communication platform 1015, which comprises electronic components and associated circuitry that provides for processing and manipulation of received signal(s) and signal(s) to be transmitted.

In an aspect, communication platform 1015 includes a receiver/transmitter 1016 that can convert analog signals to digital signals upon reception of the analog signals, and convert digital signals to analog signals upon transmission. In addition, receiver/transmitter 1016 can divide a single data stream into multiple, parallel data streams, or perform the reciprocal operation. A multiplexer/demultiplexer 1017 can be coupled to receiver/transmitter 1016, the multiplexer/demultiplexer 1017 facilitates manipulation of signal(s) in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art, e.g., Hadamard-Walsh codes, Baker codes, Kasami codes, polyphase codes, etc. A modulator/demodulator 1018, which can also a part of communication platform 1015, can modulate information according to multiple modulation techniques, such as frequency modulation, amplitude modulation, e.g., M-ary quadrature amplitude modulation (QAM), with M a positive integer), phase-shift keying (PSK), etc.

Femto access point 1005 also includes a processor 1035 configured to confer, at least in part, functionality to substantially any electronic component in femto AP 1005. In particular, processor 1035 can facilitate configuration of femto AP 1005, e.g., via one or more components of FeNOM 110. In one aspect, the one or more components of FeNOM 110 can be included in femto AP 1005. Additionally, femto AP 1005 can include display interface 1012, which can display functions that control functionality of femto AP 1005, or reveal operation conditions thereof. In addition, display interface 1012 can include a screen to convey information to an end user. In an aspect, display interface 1012 can be a liquid crystal display (LCD), a plasma panel, a monolithic thin-film based electrochromic display, and so on. Moreover, display interface can also include a component, e.g., speaker that facilitates communication of aural indicia, which can also be employed in connection with messages that convey operational instructions to an end user. Display interface 1012 also facilitates data entry e.g., through a linked keypad or via touch gestures, which can facilitated femto AP 1005 to receive external commands, e.g., restart operation.

Broadband network interface facilitates connection of femto AP 1005 to femto network via access point backhaul link(s) 253 (not shown in FIG. 10), which enable incoming and outgoing data flow. Broadband network interface 1014 can be internal or external to femto AP 1005, and it can utilize display interface 1012 for end-user interaction and status information delivery, if so included.

Processor 1035 can be functionally connected to communication platform 1015 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1035 can be functionally connected, via data, system, or address bus 1011, to display interface 1012 and broadband network interface 1014 to confer, at least in part functionality to each of such components.

In femto AP 1005, memory 1045 can retain location and/or home macro sector identifier(s); access list(s) that authorize access to wireless coverage through femto 1005; sector intelligence that includes ranking of macro sectors in the macro wireless environment of femto AP 1005, radio link quality and strength associated therewith, or the like. Memory 1045 also can store data structures, code instructions and program modules, system or device information, code sequences for scrambling, spreading and pilot transmission, femto AP floor plan configuration, and so on. Processor 1035 can be coupled, e.g., via a memory bus, to memory 1045 in order to store and retrieve information necessary to operate and/or confer functionality to the components, platform, and interfaces that reside within femto access point 1005.

Now referring to FIG. 11, wireless communication environment 1100 includes two wireless network platforms: (1) macro network platform 1110 that serves, or facilitates communication with, user equipment (UE) 1175 via a macro radio access network (RAN) 1170; and (2) femto network platform 1180, which can provide communication with UE 1175 through a femto RAN 1190, which can be linked to femto network platform 1180 via backhaul pipe(s) 1185, e.g., access point backhaul link(s) 253. Moreover, wireless communication environment 1100 includes FeNOM 110. It should be appreciated that wireless communication environment 1100 can include aspects and/or components of embodiments discussed above regarding FeNOM 110. Moreover, such aspects and/or components can be located/included within one or more components/elements, e.g., hardware, software, etc., of wireless communication environment 1100, e.g., macro network platform 1110, radio network 1190, and/or mobile device 1195.

It should also be appreciated that in cellular wireless technologies, e.g., 3GPP UMTS, HSPA, 3GPP LTE™, 4G LTE™, 3GPP2 UMB, GSM, etc., macro network platform 1110 can be embodied in a core network. It should also be appreciated that macro network platform 1110 can hand off UE 1175 to femto network platform 1110 once UE 1175 attaches, e.g., through macro-to-femto handover, to femto RAN 1190, which includes a set of deployed femto APs, e.g., femto AP 230, which can operate in accordance with aspects described herein.

RAN includes base station(s), or access point(s), and its associated electronic circuitry and deployment site(s), in addition to a wireless radio link operated in accordance with the base station(s). Accordingly, macro RAN 1170 can comprise various coverage cells like macrocell 205, while femto RAN 1190 can comprise multiple femtocell access points such as femto AP 230. Deployment density in femto RAN 1190 can be substantially higher than in macro RAN 1170.

Both macro and femto network platforms 1110 and 1180 can include components, e.g., nodes, gateways, interfaces, servers, or platforms, that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect, macro network platform 1110 includes CS gateway node(s) 1112 which can interface CS traffic received from legacy networks like telephony network(s) 1140, e.g., public switched telephone network (PSTN), or public land mobile network (PLMN), or a SS7 network 1160. Circuit switched gateway 1112 can authorize and authenticate traffic, e.g., voice, arising from such networks. Additionally, CS gateway 1112 can access mobility, or roaming, data generated through SS7 network 1160; for instance, mobility data stored in a VLR, which can reside in memory 1130. Moreover, CS gateway node(s) 1112 interfaces CS-based traffic and signaling and gateway node(s) 1118. As an example, in a 3GPP UMTS network, PS gateway node(s) 1118 can be embodied in gateway GPRS support node(s) (GGSN).

In addition to receiving and processing CS-switched traffic and signaling, PS gateway node(s) 1118 can authorize and authenticate PS-based data sessions with served, e.g., through macro RAN, wireless devices. Data sessions can include traffic exchange with networks external to the macro network platform 1110, like wide area network(s) (WANs) 1150; enterprise networks (NWs) 1170, e.g., enhanced 911, or service NW(s) 1180 like IP multimedia subsystem (IMS). It should be appreciated that local area network(s) (LANs), which can be a part of enterprise NW(s), can also be interfaced with macro network platform 1110 through PS gateway node(s) 1118. Packet-switched gateway node(s) 1118 generates packet data contexts in response to a data session being established. To that end, in an aspect, PS gateway node(s) 1118 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. In 3GPP UMTS network(s), PS gateway node(s) 1118 (e.g., GGSN) and tunnel interface (e.g., TTG) can comprise a packet data gateway (PDG).

Macro network platform 1110 also includes serving node(s) 1116 that convey the various packetized flows of information, or data streams, received through PS gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., location services, online gaming, wireless banking, wireless device management, etc. that generate multiple disparate packetized data streams or flows, and manage such flows, e.g., schedule, queue, format. Such application(s), for example can include add-on features to standard services provided by macro network platform 1110. Data streams can be conveyed to PS gateway node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS gateway node(s) 1112 and PS gateway node(s) 1118 can enact. Moreover, server(s) 1114 can provision services from external network(s), e.g., WAN 1150, or Global Positioning System (GPS) network(s), which can be a part of enterprise NW(s) 1180. Server(s) 1114 can include one or more processors configured to confer at least in part the functionality of macro network platform 1110. To that end, the one or more processors can execute code instructions stored in memory 1130, for example.

In example wireless environment 1100, memory 1130 stores information related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN 1150, SS7 network 1160, enterprise NW(s) 1170, or service NW(s) 1180.

Regarding femto network platform 1180, it can include femto gateway node(s) 1184, which have substantially the same functionality as PS gateway node(s) 1118. Additionally, femto gateway node(s) 1184 can also include substantially all functionality of serving node(s) 1116. Disparate gateway node(s) 1184 can control or operate disparate sets of deployed femto APs, which can be a part of femto RAN 1190. In an aspect, femto gateway node(s) 1184 can aggregate operational data received from deployed femto APs.

Memory 1186 can retain additional information relevant to operation of the various components of femto network platform 1180. For example, operational information that can be stored in memory 1186 can comprise, but is not limited to, subscriber intelligence; contracted services; maintenance and service records; femtocell configuration, e.g., devices served through femto RAN 1190, authorized subscribers associated with one or more deployed femto APs; service policies and specifications; privacy policies; add-on features; so forth.

Server(s) 1182 have substantially the same functionality as described in connection with server(s) 1114. In an aspect, server(s) 1182 can execute multiple application(s) that provide service, e.g., voice and data, to wireless devices served through femto RAN 1190. Server(s) 1182 can also provide security features to femto network platform. In addition, server(s) 1182 can manage, e.g., schedule, queue, format, substantially all packetized flows, e.g., IP-based, frame relay-based, ATM-based, it generates in addition to data received from macro network platform 1110. Furthermore, server(s) 1182 can effect provisioning of femtocell service, and effect operations and maintenance. Server(s) 1182 can include one or more processors configured to provide at least in part the functionality of femto network platform 1180. To that end, the one or more processors can execute code instructions stored in memory 1186, for example.

As is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of mobile wireless devices. A processor can also be implemented as a combination of computing processing units.

In the subject specification, terms such as "store", "data store", "data storage", "database", "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, which can be included in memory 1045, memory 1130, memory 1186, non-volatile memory 1222 (see below), disk storage 1224 (see below), and memory storage 1246 (see below) can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM can include forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
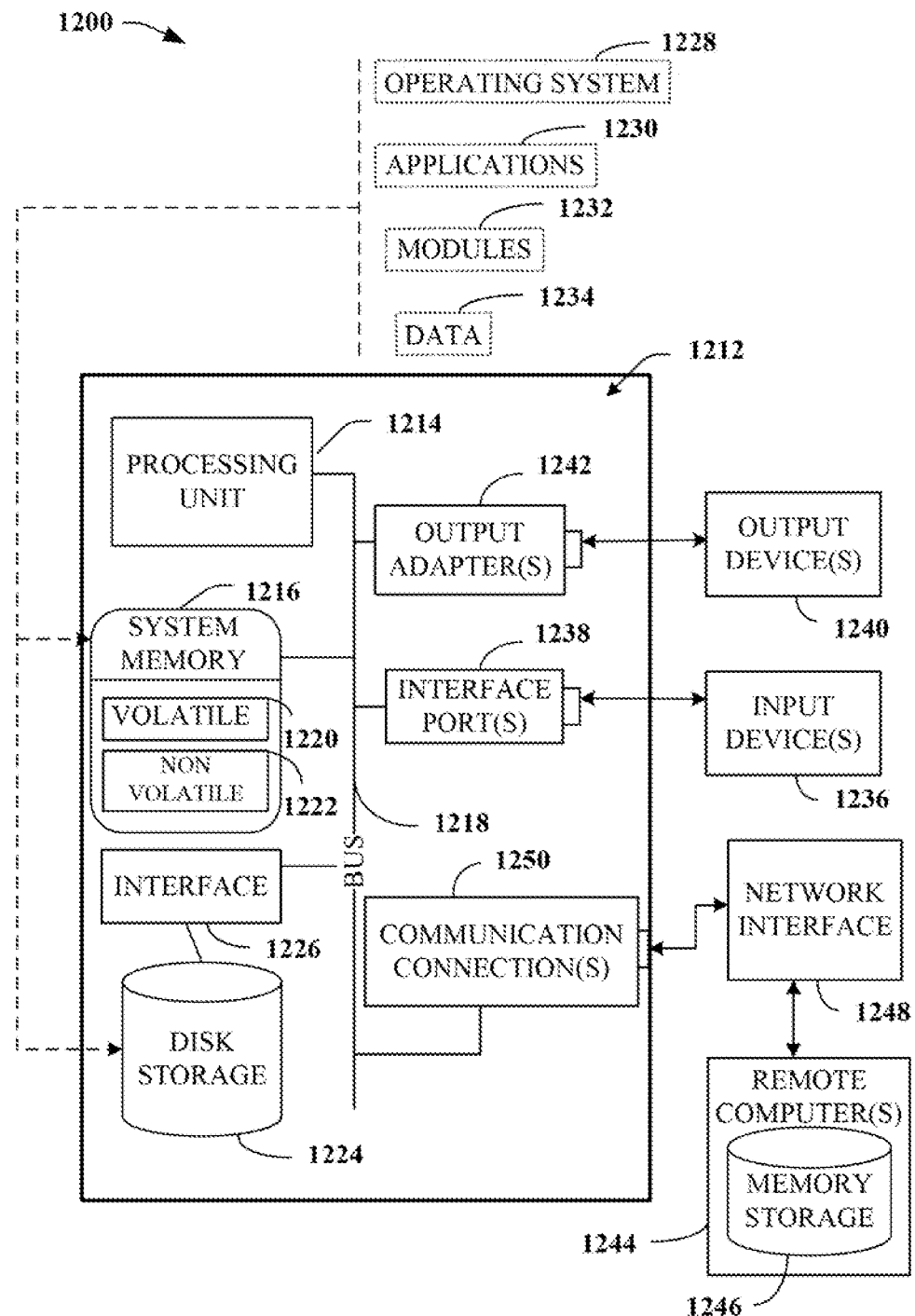
FIG. 12 is a block diagram representing an illustrative non-limiting computing system or operating environment in which one or more aspects of various embodiments described herein can be implemented.

In order to provide a context for the various aspects of the disclosed subject matter, FIG. 12, and the following discussion, are intended to provide a brief, general description of a suitable environment in which the various aspects of the disclosed subject matter can be implemented, e.g., various systems and/or processes associated with FIGS. 1-11. While the subject matter has been described above in the general context of computer-executable instructions of a computer program that runs on a computer and/or computers, those skilled in the art will recognize that various aspects disclosed herein can be implemented in combination with other program modules. Program modules can include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM can include forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media, networked attached storage (NAS), e.g., SAN storage, etc. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface can be used, such as interface 1226.

FIG. 12 describes software that acts as an intermediary between users and computer resources described in suitable operating environment 1200. Such software includes an operating system 1228. Operating system 1228, which can be stored on disk storage 1224, acts to control and allocate resources of computer 1212. System applications 1230 utilize the management of resources by operating system 1228 through program modules 1232 and program data 1234 stored either in system memory 1216 or on disk storage 1224. The disclosed subject matter can be implemented with various operating systems or combinations of operating systems.

A user can enter commands or information into computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output devices 1240 like monitors, speakers, and printers, among other output devices 1240, can use special adapters such as output adapters 1242. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and can include many or all of the elements described relative to computer 1212.

For purposes of brevity, only a memory storage device 1246 is illustrated with remote computer(s) 1244. Remote computer(s) 1244 can be logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a processor, information from femtocell devices representing operating conditions with respect to signals detected by the femtocell devices, wherein an operating condition of the operating conditions comprises a first number of mobile devices that have attempted to register with a first femtocell device of the femtocell devices and that have not been authorized to access the first femtocell device;
in response to the first number of mobile devices being determined to satisfy a defined condition with respect to a second number of mobile devices that have attempted to register with a second femtocell device of the femtocell devices and that have not been authorized to access the second femtocell device, assigning, by the system, the first femtocell device and the second femtocell device to a group of femtocell devices; and
in response to the assigning of the first femtocell device and the second femtocell device to the group of femtocell devices, directing, by the system, a change of a parameter to the group of femtocell devices.

2. The method of claim 1, wherein the assigning comprises sorting the femtocell devices into groups comprising the group of femtocell devices.

3. The method of claim 1, further comprising directing, by the system, a macrocell parameter change of a macrocell parameter of a macrocell device associated with the group of femtocell devices.

4. The method of claim 1, wherein the first femtocell device is associated with a first wireless communication environment and the second femtocell device is associated with a second wireless communication environment different than the first wireless communication environment.

5. The method of claim 1, wherein the directing comprises directing a power change of a transmission power to the group of femtocell devices.

6. A system, comprising:
a memory that stores executable instructions; and
a processor, coupled to the memory, that facilitates execution of the executable instructions to perform operations, comprising:
receiving, from femto cell devices, information representing operating conditions with respect to signals detected by the femtocell devices, wherein an operating condition of the operating conditions comprises a first number of mobile devices that have attempted to register with a first femtocell device of the femtocell devices and that have not been authorized to access the first femtocell device;
in response to the first number of mobile devices being determined to satisfy a defined condition with respect to a second number of mobile devices that have attempted to register with a second femtocell device of the femtocell devices and that have not been authorized to access the second femtocell device, categorizing the first femtocell device and the second femtocell device into a group of femtocell devices; and
in response to the categorizing of the first femtocell device and the second femtocell device into the group of femtocell devices, directing a change of a parameter to the group of femtocell devices.

7. The system of claim 6, wherein the information represents a result of a network scan that is associated with the femtocell devices.

8. The system of claim 7, wherein the result of the network scan is associated with a macrocell device corresponding to the femtocell devices.

9. The system of claim 6, wherein the information represents a strength of a signal that is detected by a femtocell device of the femtocell devices.

10. The system of claim 6, wherein the information represents a detected power that is associated with a communication channel.

11. The system of claim 6, wherein the information represents a received signal strength indicator that is associated with a signal that is received by a femtocell device of the femtocell devices.

12. The system of claim 6, wherein the information represents a level of interference of a signal that is detected by a femtocell device of the femtocell devices.

13. The system of claim 6, wherein the information represents a period of time associated with a use of a femtocell device of the femtocell devices.

14. The system of claim 6, wherein the parameter comprises a transmission power.

15. The system of claim 6, wherein the operations further comprise directing a handover change of a handover to a femtocell device of the group of femtocell devices.

16. The system of claim 6, wherein the operations further comprise directing a parameter change of an operating parameter of a macrocell device to the macrocell device based on the information.

17. The system of claim 6, wherein the first femtocell device is associated with a first wireless communication environment, and wherein the second femtocell device is associated with a second wireless communication environment different than the first wireless communication environment.

18. The system of claim 6, wherein the parameter comprises a wireless communication channel.

19. A computer-readable storage device comprising executable instructions that, in response to execution, cause a system comprising a processor to perform operations, comprising:

in response to receiving, from femtocell devices, information representing operating conditions of the femtocell devices with respect to signals detected by the femtocell devices, determining whether an operating condition of the operating conditions satisfies a defined condition with respect to a first amount of mobile devices that have attempted to register with a first femtocell device of the femtocell devices and that have not been authorized to access the first femtocell device, and with respect to a second amount of mobile devices that have attempted to register with a second femtocell device of the femtocell devices and that have not been authorized to access the second femtocell device;

in response to determining that the operating condition satisfies the defined condition with respect to the first amount of mobile devices that have attempted to register with the first femtocell device and that have not been authorized to access the first femtocell device, and with respect to the second amount of mobile devices that have attempted to register with the second femtocell device and that have not been authorized to access the second femtocell device, categorizing the first femtocell device and the second femtocell device into a group of femtocell devices; and in response to the categorizing of the first femtocell device and the second femto cell device, directing, to the group of femtocell devices, a change of a parameter.

20. The computer-readable storage device of claim 19, wherein the categorizing comprises categorizing the first femtocell device and the second femtocell device into the group of femtocell devices based on a quality of a signal of the signals.

* * * * *